US010103654B2

(12) United States Patent
Yun et al.

(10) Patent No.: US 10,103,654 B2
(45) Date of Patent: Oct. 16, 2018

(54) ENERGY HARVESTING APPARATUS AND ELECTRONIC APPARATUS HAVING THE SAME

(71) Applicant: SAMSUNG ELECTRONICS CO., LTD., Suwon-si (KR)

(72) Inventors: Dae-yeon Yun, Seoul (KR); Hyun-taek Na, Suwon-si (KR); Yui-yoon Lee, Suwon-si (KR); Su-hwan Jin, Suwon-si (KR); Dae-hyun Nam, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 414 days.

(21) Appl. No.: 15/016,430

(22) Filed: Feb. 5, 2016

(65) Prior Publication Data

US 2017/0077841 A1    Mar. 16, 2017

(30) Foreign Application Priority Data

Sep. 14, 2015    (KR) .................. 10-2015-0129912

(51) Int. Cl.
*H02N 3/00* (2006.01)
*H02N 11/00* (2006.01)
*H02N 1/08* (2006.01)

(52) U.S. Cl.
CPC .......... *H02N 11/002* (2013.01); *H02N 1/08* (2013.01); *H02N 3/00* (2013.01)

(58) Field of Classification Search
CPC .................................. H02N 1/08; H02N 3/00
See application file for complete search history.

(56) References Cited

U.S. PATENT DOCUMENTS

| 7,898,096 | B1 | 3/2011 | Krupenkin |
| 8,053,914 | B1 | 11/2011 | Krupenkin |
| 2003/0160543 | A1 | 8/2003 | Lee et al. |
| 2006/0130476 | A1 | 6/2006 | Fitch et al. |
| 2009/0085427 | A1 | 4/2009 | Borno et al. |
| 2011/0095648 | A1 | 4/2011 | Zhang |
| 2012/0186672 | A1 | 7/2012 | Fisenko et al. |

OTHER PUBLICATIONS

Communication dated Jan. 16, 2017 issued by the European Patent Office in counterpart European Patent Application No. 16160608.2.
Communication dated May 31, 2016 issued by the International Searching Authority in counterpart International Patent Application No. PCT/KR2016/001165 (PCT/ISA/210/237).

*Primary Examiner* — Ramon M Barrera
(74) *Attorney, Agent, or Firm* — Sughrue Mion, PLLC

(57) ABSTRACT

An energy harvesting apparatus includes a housing that includes an internal portion filled with dielectric liquid in a vacuum state, first and second electrode portions that are disposed to face each other in the housing and configured to be polarized with different polarities, a first layer that forms a path along the internal portion of the housing to allow the dielectric liquid and bubbles generated from the dielectric liquid to flow through the path, and a second layer configured to insulate the first and second electrode portions from the housing. The bubbles are generated from the dielectric liquid when thermal energy is applied to the housing. The first and second electrode portions may change a dielectric constant of the dielectric liquid when the bubbles move between the first and second electrode portions to generate current.

20 Claims, 11 Drawing Sheets

THERMAL ENERGY

THERMAL ENERGY

FIG. 11
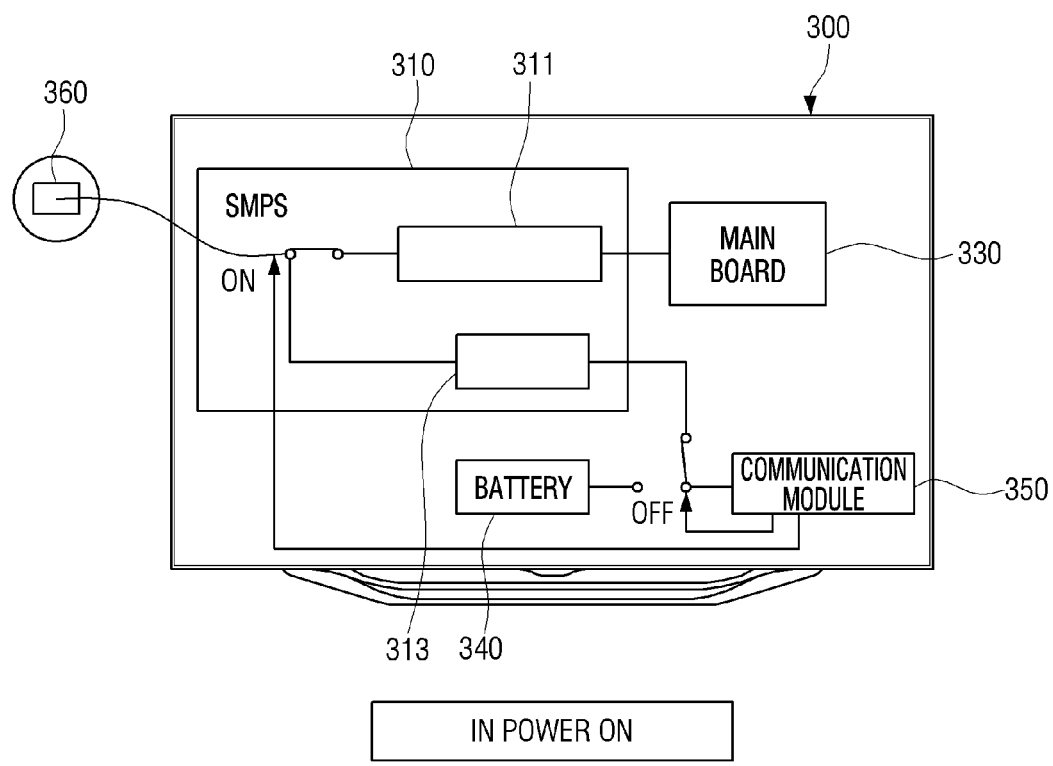
IN POWER ON
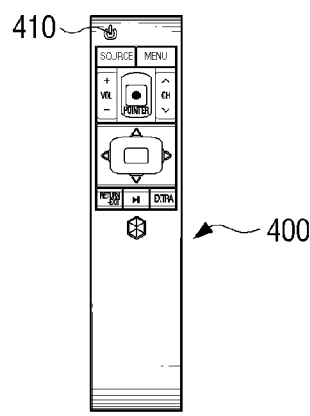

ENERGY HARVESTING APPARATUS AND ELECTRONIC APPARATUS HAVING THE SAME

CROSS-REFERENCE TO RELATED APPLICATION

This application claims priority from Korean Patent Application No. 10-2015-0129912, filed on Sep. 14, 2015 in the Korean Intellectual Property Office, the disclosure of which is incorporated herein by reference in its entirety.

BACKGROUND

Field

Apparatuses and methods consistent with exemplary embodiments relate to an energy harvesting apparatus for harvesting energy through a reverse electrowetting phenomenon.

Description of the Related Art

In general, an energy harvesting method is used to harvest various types of energies that are normally lost as heat. Energy harvested via such an energy harvesting method has been reused as driving power of various apparatuses. Such an energy harvesting method has harvested discharged optical energy, thermal energy, kinetic energy, frictional energy, and the like. Recently, an energy harvesting method using a reverse electrowetting principle has been introduced.

The energy harvesting method performed on the reverse electrowetting principle may convert mechanical energy or thermal energy to electrical energy by using movement of fluid droplets that flow through a certain polarization pattern. In the energy harvesting method using reverse electrowetting, pressure or other external pressures according human movement are applied to move fluid droplets.

The energy harvesting method using reverse electrowetting generates large output even in a small area compared with other energy harvesting methods and uses harvested energy as operating power of a predetermined device.

The energy harvesting method using the reverse electrowetting phenomenon controls fluid droplets through pressure generated by applying mechanical energy (pressure according to human movement or other external pressures) in order to move the fluid droplets as described above.

However, when mechanical energy is used, it is difficult to control the size of fluid droplets, and thus desired power may not be generated. In addition, external force derived from a separate machine, equipment, or a human body is used in order to apply mechanical energy, and thus power may not be continuously produced and energy may not effectively used.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide an energy harvesting apparatus that harvests electric energy wasted by other apparatuses through a reverse electrowetting phenomenon without using separate mechanical energy.

Further, one or more exemplary embodiments provide an energy harvesting apparatus that controls the size of bubbles to be a predetermined size so that constant power is continuously generated from the energy harvesting apparatus.

According to an aspect of an exemplary embodiment, there is provided an energy harvesting apparatus including: a housing that includes an internal portion filled with dielectric liquid in a vacuum state, first and second electrode portions that are disposed to face each other in the housing and configured to be polarized with different polarities, a first layer that forms a path along the internal portion of the housing to allow the dielectric liquid and bubbles generated from the dielectric liquid to flow through the path, and a second layer configured to insulate the first and second electrode portions from the housing, wherein the bubbles are generated from the dielectric liquid when thermal energy is applied to the housing, and the first and second electrode portions change a dielectric constant of the dielectric liquid when the bubbles move between the first and second electrode portions to generate current.

A first electrode pattern of the first electrode portion may be symmetrical to a second electrode pattern of the second electrode portion.

A first end of the first electrode pattern and a first end of the second electrode pattern may face each other and may be positioned on a first imaginary straight line that contacts an outer periphery of the path. A second end of the first electrode pattern and a second end of the second electrode pattern may face each other and may be positioned on a second imaginary straight line that contacts the outer periphery of the path and is positioned in parallel to the first imaginary straight line The path may have a constant inner diameter from a first end portion of the housing to a second end portion of the housing.

The first layer may be formed of a hydrophobic material.

The housing may include a bubble size determining member that is disposed in one side to which heat is input from a heat source and configured to adjust a size of the bubbles.

The bubble size determining member may adjust the size of the bubbles to be a size corresponding to an inner diameter of the path.

The bubble size determining member may include an inlet and an outlet and have a shape of a cone with a diameter that gradually tapers towards the outlet from the inlet.

The outlet is disposed before a position where the electrode patterns of the first and second electrode portions are started.

The housing may have a repeated s-shape. In this case, the housing may include a plurality of paths, and the plurality of paths may be connected in series to each other. The first and second electrode portions are arranged as a pair at positions at which the plurality of paths are formed.

The housing may include a heat inputter that has an area larger than an area of a heating portion, and a plurality of paths may be formed between the heat inputter and the heating portion. In this case, the first and second electrode portions may be arranged as a pair in the plurality of paths. The plurality of paths may be connected in parallel to each other.

According to an aspect of another exemplary embodiment, there is provided an energy harvesting apparatus including: a housing that includes an internal portion filled with dielectric liquid and is extended in a longitudinal direction, and positive and negative electrode portions arranged to be symmetrical with each other along the internal portion of the housing, wherein bubbles are generated from the dielectric liquid when thermal energy is applied to the housing, and the positive and negative electrode portions change a dielectric constant of the dielectric liquid when the bubbles move between the positive and negative electrode portions to generate current.

According to an aspect of another exemplary embodiment, there is provided an electronic apparatus including: a heat source, and an energy harvesting apparatus configured to absorb thermal energy emitted from the heat source to generate electric energy via a reverse electrowetting method, wherein the energy harvesting apparatus includes a housing that comprises an internal portion filled with dielectric liquid in a vacuum state, and first and second electrode portions that are disposed to face each other in the housing and configured to be polarized with different polarities; and bubbles are generated from the dielectric liquid when thermal energy is applied to the housing, and the first and second electrode portion, change a dielectric constant of the dielectric liquid when the bubbles move between the first and second electrode portions to generate current.

The electronic apparatus may further include a first layer that forms a path along the internal portion of the housing to allow the dielectric liquid and the bubbles to flow through the path; and a second layer configured to insulate the first and second electrode portions from the housing, wherein the path may have a constant inner diameter from a first end portion of the housing to a second end portion of the housing.

The housing may include a bubble size determining member disposed in one side to which heat is input from a heat source and configured to adjust a size of the bubbles; and the bubble size determining member may include an inlet and an outlet and has a shape of a cone with a diameter that gradually tapers towards the outlet from the inlet.

The energy harvesting apparatus may further include a plurality of paths through which the dielectric liquid and the bubbles flow, and the plurality of paths may be connected in series or parallel to each other.

According to an aspect of another exemplary embodiment, there is provided an energy harvesting apparatus including: a housing that contains dielectric liquid in a vacuum state and comprises a first end portion, a second end portion, and a straight portion disposed between the first end portion and the second end portion, the first end portion and the second end portion having a curve shape; and positive and negative electrodes that are disposed to face each other in the straight portion; wherein bubbles are generated from the dielectric liquid when thermal energy is applied to the first end portion and flow to the second end portion through the straight portion, and wherein the positive and negative electrodes change a dielectric constant of the dielectric liquid when the bubbles move between the first and second electrode portions to generate current.

The first end portion may include a bubble size determining member configured to adjust a size of the bubbles to be a constant value.

According to the various exemplary embodiments, electric energy may be generated using discarded thermal energy that is generated from a heat source of a device and may also disperse heat from the heat source and dissipate heat so as to prevent durability of the device from being degraded due to heat.

BRIEF DESCRIPTION OF THE DRAWINGS

The above and/or other aspects will be more apparent by describing certain exemplary embodiments, with reference to the accompanying drawings, in which:

FIGS. 8 to 11 are schematic diagrams illustrating a display apparatus using standby power accumulated using an energy harvesting apparatus according to exemplary embodiments.

DETAILED DESCRIPTION

Figure 1:
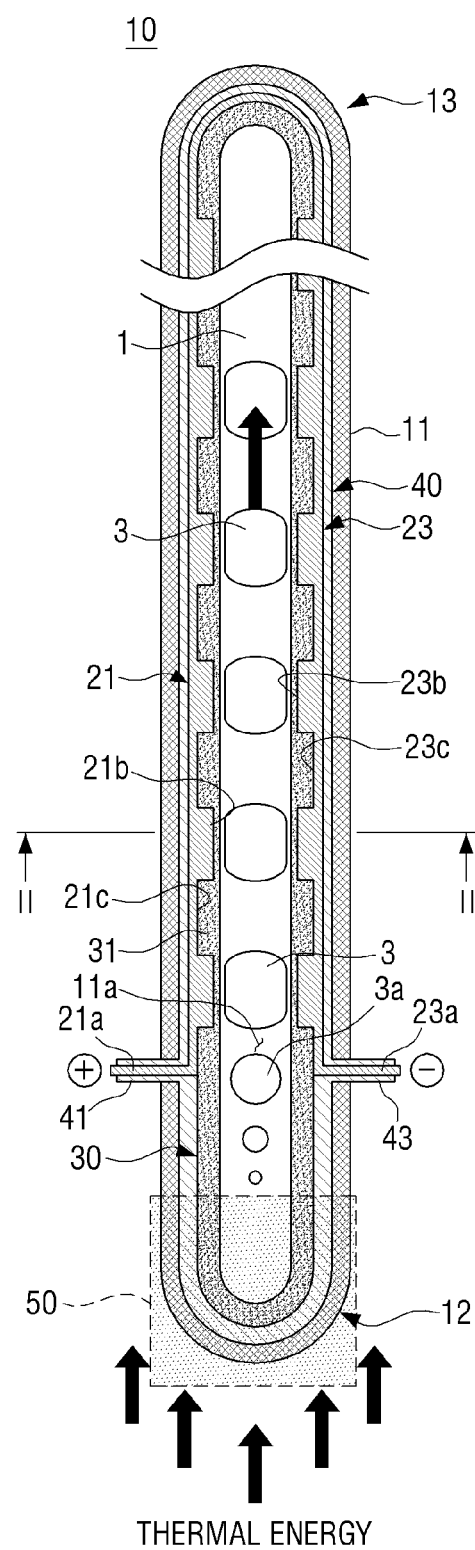
FIG. 1 is a schematic diagram illustrating an energy harvesting apparatus according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

It will be understood that, the terms first, second, third etc. may be used herein to describe various elements irrespective of an order and/or importance and are only used to distinguish one element from another element. For example, a first user device and a second user device may refer to different user devices irrespective of an order or importance.

As used herein, the singular forms are intended to include the plural forms as well, unless the context clearly indicates otherwise. Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An energy harvesting apparatus using reverse electrowetting according to exemplary embodiments may heat dielectric liquid pre-injected into a channel prepared in an energy harvesting apparatus using thermal energy that is not used and is discarded in various devices rather than adding mechanical energy like in a conventional case to generate bubbles with a predetermined size and interval and may electrostatically generate electrical energy according to change in a dielectric constant, which occurs when the generated bubbles are moved between a plurality of positive (+) electrode and negative (−) electrode patterns that face each other.

As such, the energy harvesting apparatus according to the exemplary embodiments may harvest thermal energy that is naturally generated from a heating component (a heat source) as electric energy as various devices, for example, electronic apparatus including a light source, a semiconductor chip, or the like, which generates heat while being driven, are driven. The harvested electric energy is stored in a storage battery or the like and then is used as standby power of an electronic apparatus such as a television (TV) or used as standby power of an Internet of things (Internet of Things) device.

Hereinafter, a structure of an energy harvesting apparatus according to diverse exemplary embodiments will be described in detail with reference to the accompanied drawings.

Figure 2:
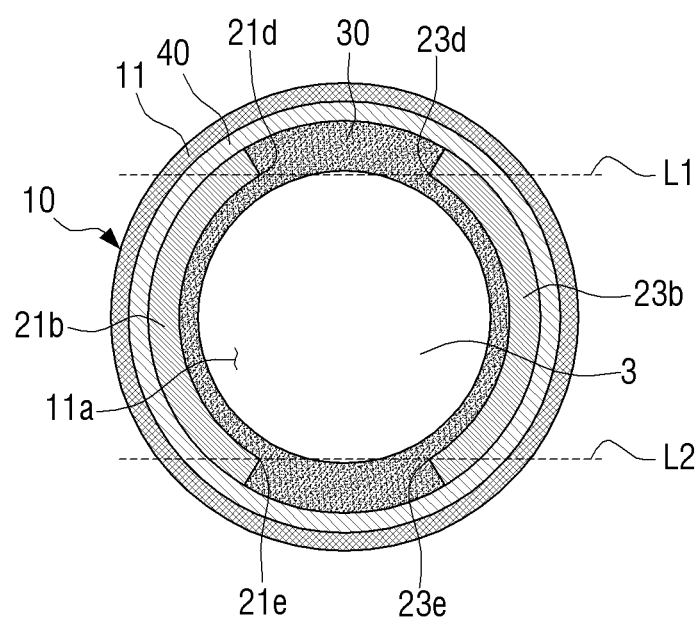
FIG. 2 is a cross-sectional view of the energy harvesting apparatus taken along a line II-II illustrated in FIG. 1.
Figure 3:
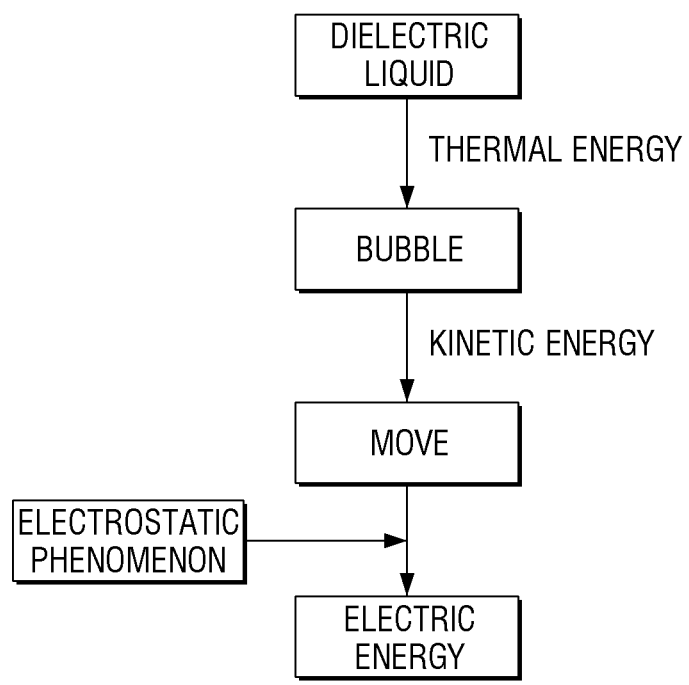
FIG. 3 is a block diagram illustrating a procedure for converting thermal energy into electric energy by the energy harvesting apparatus of FIG. 1.

FIG. 1 is a schematic diagram illustrating an energy harvesting apparatus 10 according to an exemplary embodiment. FIG. 2 is a cross-sectional view of the energy harvesting apparatus 10 taken along a line II-II illustrated in FIG. 1. FIG. 3 is a block diagram illustrating a procedure for converting thermal energy into electric energy by the energy harvesting apparatus 10 of FIG. 1.

Referring to FIG. 1, the energy harvesting apparatus 10 according to the exemplary embodiment may include a housing 11, first and second electrode portions 21 and 23 that are disposed in the housing 11 and arranged to face each other, a hydrophobic layer 30 that isolates the first and second electrode portions 21 and 23 from dielectric liquid, and an insulating layer 40 that insulates the housing 11 and the first and second electrode portions 21 and 23.

The housing 11 may be formed with a predetermined length to constitute a path 11a shaped like a channel in which dielectric liquid 1 is charged and bubbles generated in the dielectric liquid 1 is moveable. The length of the housing 11 may be determined to electrostatically generate a predetermined amount of electric energy through the first and second electrode portions 21 and 23 while bubbles generated from the dielectric liquid 1 are moved along the path 11a of the housing 11. In this case, the path 11a may be configured with an inner diameter corresponding to a size of each bubble 3 of about 1 mm or less.

The housing 11 is straightly formed as illustrated in FIG. 3, without being limited thereto, and thus the housing 11 may be configured in an appropriate form in consideration of a structure of a portion of an electronic apparatus, in which the energy harvesting apparatus 10 is installed. For example, the housing 11 may be rounded with a predetermined curvature in a longitudinal direction of the housing 11.

The housing 11 may have a first end 12 and a second end 13. The housing 11 may have an internal portion (e.g., the path 11a) in a vacuum state. The housing 11 may have a circular cross section to maintain the vacuum state of the internal portion in the housing 11, as illustrated in FIG. 2. However, the cross section shape of the housing 11 is not limited thereto, and the housing 11 may have a cross section with any shape such as an oval shape as long as the vacuum state is maintained in the housing 11.

A filling rate of the dielectric liquid 1 filled in the path 11a of the housing 11 may be a factor for determining an amount of harvested energy of the energy harvesting apparatus 10 according to a size (e.g., a diameter, a length, and an entire area) of the housing 11 and an area of the first end 12 of the housing 11 to which heat is transferred. In addition, a vacuum rate of the housing 11 may act as a factor for optimizing a boiling point according to the amount of heat input through the first end 12 of the housing 11.

The housing 11 may be formed of high strength synthetic resin to ensure predetermined rigidity. When the housing 11 is formed of a metallic material with a higher heat transfer coefficient than synthetic resin, the housing 11 may rapidly move thermal energy applied to the first end 12 of the housing 11 to the second end 13 of the housing 11.

The dielectric liquid 1 in the housing may be changed to bubbles via phase change according to heat applied to the first end 12. When the bubbles 3 moves along the path 11a, the heat may transfer to an entire portion of the housing 11. Accordingly, a heat dissipation effect of lowering a temperature (e.g., a light source included in a display apparatus or a semiconductor chip included in an electronic apparatus) of a heat source for providing thermal energy may be achieved.

The first electrode portion 21 may be a positive electrode and may be disposed in a longitudinal direction of the housing 11 in the housing 11. The second electrode portion 23 may be a negative electrode and may be disposed in the longitudinal direction of the housing 11 so as to face the first electrode portion 21.

The first and second electrode portions 21 and 23 may be polarized with a predetermined voltage. The first and second electrode portions 21 and 23 may respectively have first and second electrode patterns 21b and 23b that are symmetrical to each other at a predetermined interval. As illustrated in FIG. 2, a first end point 21d of the first electrode pattern 21b and a first end point 23d of the second electrode pattern 23b may be positioned on an imaginary first straight line L1 that contacts an outer periphery of the path 11a. A second end point 21e of the first electrode pattern 21b and a second end point 23e of the second electrode pattern 23b may be positioned on an imaginary second straight line L2 that contacts an outer periphery of the path 11a and is positioned in parallel to the imaginary first straight line L1. Accordingly, the areas of the electrode patterns 21b and 23b may be maximized.

In order to maximize an electric energy harvesting amount, the electrode patterns 21b and 23b of the first and second electrode portions 21 and 23 may be designed to have the same or similar sizes as those of the bubbles 3. The size of the bubbles 3 may be controlled by applying a predetermined heat quantity to the first end 12 of the housing 11 and may also be controlled by a bubble size determining member 70 that will be described later.

The first and second electrode portions 21 and 23 may have terminals 21a and 23a disposed on respective ends of the first and second electrode portions 21 and 23. The terminals 21a and 23a may protrude from the housing 11 and may be covered by portions 41 and 43 of an insulating layer 40 that will be described lateral so as to be insulated.

The terminals 21a and 23a of the first and second electrode portions 21 and 23 may be connected to a positive (+) terminal and a negative (−) terminal of a capacitor or rechargeable battery, respectively. Accordingly, electric energy that is generated by the bubbles 3 transmitted between the first and second electrode portions 21 and 23 in an electrostatic manner may be stored in the capacitor or the rechargeable battery.

The hydrophobic layer 30 may be coated on the first and second electrode portions 21 and 23 to cover internal lateral surfaces of the first and second electrode portions 21 and 23. The hydrophobic layer 30 may minimize surface tension of the dielectric liquid 1 and the bubbles 3 that flow along the path 11*a*. Accordingly, the hydrophobic layer 30 may enhance a moving speed of the dielectric liquid 1 and the bubbles 3.

The hydrophobic layer 30 may define the path 11*a* of the housing 11. An inner diameter of the hydrophobic layer 30 may be substantially constant in a longitudinal direction of the housing 11.

The insulating layer 40 may be coated on the first and second electrode portions 21 and 23 to cover external lateral surfaces of the first and second electrode portions 21 and 23 and insulate the first and second electrode portions 21 and 23 from the housing 11.

A procedure for harvesting electric energy from thermal energy through the energy harvesting apparatus 10 of FIG. 1 will be described with reference to FIG. 3.

The energy harvesting apparatus 10 may be installed in an electronic apparatus. The first end 12 (hereinafter, referred to as a heat inputter 50) of the housing 11 contacts a component generating a large amount of heat among components included in the electronic apparatus and indirectly receives heat.

As illustrated in FIG. 1, heat (e.g., thermal energy) generated by a heating component of the electronic apparatus is applied to the heat inputter 50. When a temperature of the heat inputter 50 or an inner portion of the path 11*a* is equal to or greater than a boiling temperature of the dielectric liquid 1, the phase of the dielectric liquid 1 is changed and is partially gasified to generate the bubbles 3.

The generated bubbles 3 may be moved to the second end 13 (hereinafter, referred to as a 'heating portion') of the housing 11. The bubbles 3 may move along the path 11*a* of the housing 11 with a constant inner diameter. The hydrophobic layer 30 may be coated in the housing 11 to allow the bubbles 3 to pass through the path 11*a* at a high speed without influence of surface tension.

Accordingly, the bubbles 3 may pass between the first and second electrode portions 21 and 23 polarized with a predetermined voltage. In this case, electric charges may be moved according to an electrostatic phenomenon generated between the bubbles 3 and the electrode patterns 21*b* and 23*b* of the first and second electrode portions 21 and 23. According to movement of electric charges, current may flow in the first and second electrode portions 21 and 23 and generated current may be stored in a capacitor or a rechargeable battery.

The bubbles 3 that are moved to the second end 13 of the housing 11 may have a lower pressure than in the heat inputter 50 and thus may be changed to liquid via phase change.

The harvested electric energy may be used as standby power or operating power of the electronic apparatus. The maximum amount of the harvested electric energy may be determined based on the length of the housing 11, the number of the electrode patterns 21*b* and 23*b* of the first and second electrode portions 21 and 23, the inner diameter of the path 11*a* of the housing 11, and the size of the generated bubbles 3 (e.g., about 1 mm or less).

As described above, the energy harvesting apparatus 10 of FIG. 1 may heat the dielectric liquid 1 through thermal energy to use kinetic energy for moving the bubbles 3 and generate electric energy along with movement of the bubbles 3. As a result, the energy harvesting apparatus 10 of FIG. 1 may harvest electric energy through discarded thermal energy of the electronic apparatus. In addition, according to exemplary embodiments, kinetic energy of bubbles generated according to thermal energy may make sound speed as moving speed to have excellent frequency characteristics, thereby enhancing the amount of generated electric energy.

The energy harvesting apparatus 10 of FIG. 1 may employ a method for applying thermal energy instead of a conventional method for using mechanical energy so as to supply a continuous and stable energy source to a heat inputter. Accordingly, harvested electricity may be used as standby power or operating power of the electronic apparatus. In addition, according to exemplary embodiments, eco-friendliness may be achieved by generating electric energy using discarded thermal energy.

In addition, the energy harvesting apparatus 10 of FIG. 1 may achieve a heat dissipation effect of lowering temperature of a heat source while transferring heat to an entire housing 11 by using the movement of the bubbles 3. The energy harvesting apparatus 10 may generate electric energy from the movement of the bubbles 3 when heat is locally applied to the first end 12 of the housing 11 and the dielectric fluid 1 is changed to the bubble 3.

Such an effect of the energy harvesting apparatus 10 of FIG. 1 may also be applied in the same way to energy harvesting apparatuses according to various exemplary embodiments that will be described below.

Hereinafter, with reference to FIGS. 4 to 7, exemplary embodiments of the energy harvesting apparatus 10 of FIG. 1 will be described. FIGS. 4 to 7 are schematic diagrams illustrating energy harvesting apparatuses according to exemplary embodiments, respectively.

Figure 4:
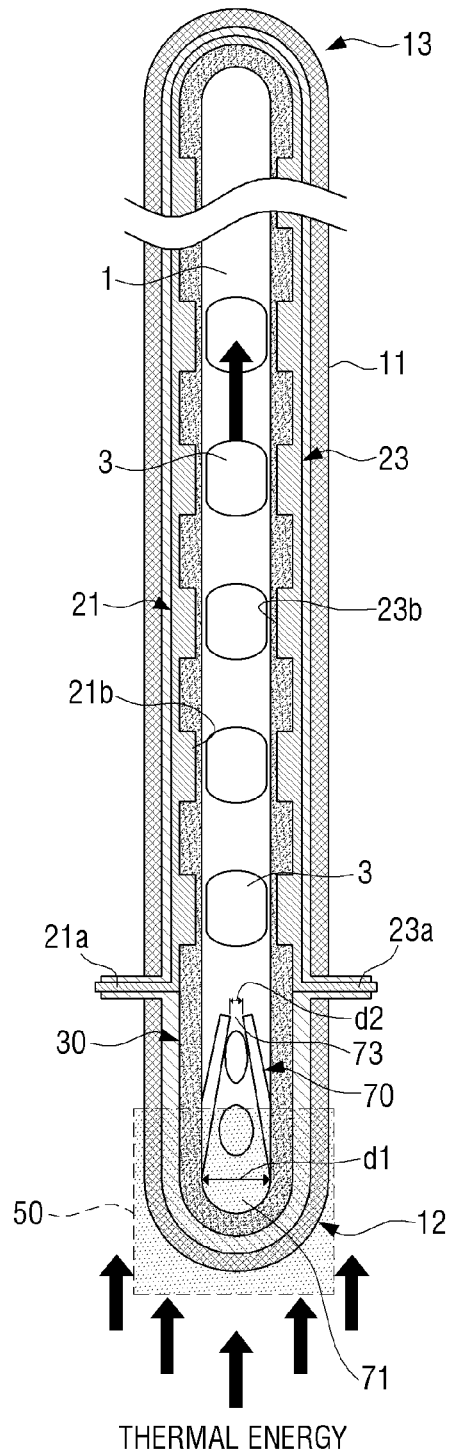
FIG. 4 is a schematic diagram illustrating an energy harvesting apparatus according to another exemplary embodiment.

Referring to FIG. 4, an energy harvesting apparatus 10*a* according to another exemplary embodiment may have the same configuration as the energy harvesting apparatus 10 of FIG. 1 and may further include the bubble size determining member 70 that controls the size of the bubbles 3. Accordingly, the same components as in FIG. 1 are denoted by the same references, and thus a detailed description thereof will be omitted.

The bubble size determining member 70 may adjust the size of the bubbles 3*a* generated from the dielectric liquid 1 to be a predetermined size corresponding to an inner diameter of the path 11*a*. The bubble size determining member 70 may include a first end that is disposed in the path 11*a* at a position approximately corresponding to the position of the first end 12 of the housing 11. The bubble size determining member 70 may include a second end that is disposed at a position approximately before the electrode patterns 21*b* and 23*b* of the first and second electrode portions 21 and 23 are started.

The bubble size determining member 70 may include an inlet 71 disposed at the first end of the bubble size determining member 70 and an outlet 73 disposed at the second end of the bubble size determining member 70. The diameter d1 of the inlet 71 may be approximately the same as the diameter of the path 11*a*. The diameter d2 of the outlet 73 may be smaller than the diameter d1 of the inlet 71. In addition, the bubble size determining member 70 may be shaped like a cone, a diameter of which continuously tapers towards the outlet 73 from the inlet 71.

The diameter d2 of the outlet 73 may be smaller than the size of the bubbles 3*a* inside the bubble size determining member 70 so that the size of the bubbles 3*a* is adjusted to be a predetermined size after the bubbles 3*a* are output from the outlet 73 of the bubble size determining member 70. Accordingly, the bubbles 3*a* generated with different sizes may be adjusted with a size corresponding to a predetermined size, that is, an inner diameter of the path 11*a* after passing through the outlet 73 of the bubble size determining member 70.

A length of the bubble size determining member 70 and an inclination degree of the conical shape may be set based on the amount of heat applied to the heat inputter 50, a diameter of the path 11*a*, and the size of bubbles.

Figure 5:
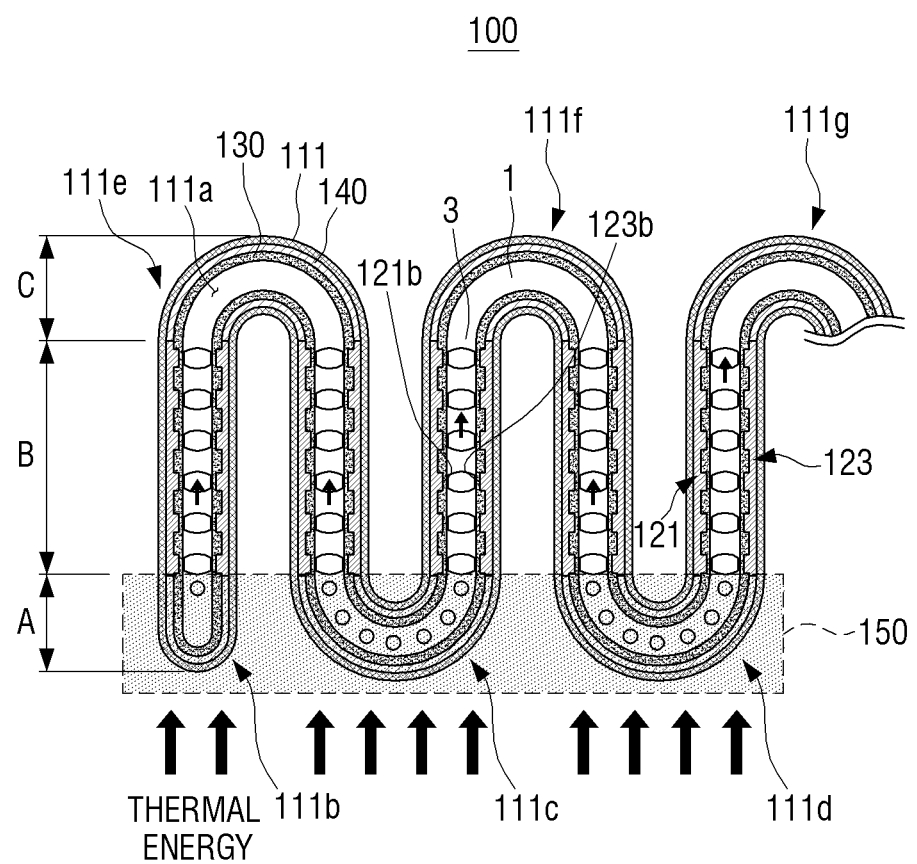
FIG. 5 is a schematic diagram illustrating an energy harvesting apparatus according to another exemplary embodiment.

Referring to FIG. 5, an energy harvesting apparatus 100 according to another exemplary embodiment may have the same configuration as the energy harvesting apparatus 10 of FIG. 1, except that the energy harvesting apparatus 100 of FIG. 5 is formed to a greater length than the energy harvesting apparatus 10 of FIG. 1.

The energy harvesting apparatus 100 of FIG. 5 may include a housing 111 that extends in a repeated s-shaped form. First and second electrode portions 121 and 123, a hydrophobic layer 130, and an insulating layer 140, which are included in the housing 111, may also extend along an internal portion of the housing 111.

The energy harvesting apparatus 100 may include a straight portion corresponding to a section B and curved portions corresponding to sections A and C. The first and second electrode portions 121 and 123 may be formed in the section B. The first and second electrode portions 121 and 123 may not be formed in the section A that generates bubbles and has a smaller size than bubbles with an effective size and the second B in which bubbles disappear via phase change. The section A may correspond to one ends 111*b*, 111*c*, and 111*d* of the housing 111 included in a heat inputter 150 to which heat is applied by a heat source and the section C may correspond to the other ends 111*e*, 111*f*, and 111*g* of the housing 111 corresponding to a heating portion.

In the energy harvesting apparatus 100 of FIG. 5, when heat is applied to the heat inputter 150 to increase a current temperature to a boiling point of the dielectric liquid 1 or higher, bubbles may be generated via phase change and moved upward along a plurality of paths 111*a* disposed in parallel to each other.

The energy harvesting apparatus 100 of FIG. 5 has a closed loop as the paths 111*a*, and thus bubbles may be moved in one direction from an internal portion of the housing 111. In the section C, bubbles 1 that are moved upward may be lowered in pressure and then may be re-changed to liquid via phase change, and the phase-changed liquid may be moved downwards, that is, towards the heat inputter 150 along the housing 111.

A reference numeral 121*b* may refer to an electrode pattern of the first electrode portion 121, a reference numeral 123*b* may refer to an electrode pattern of the second electrode portion 123, a reference numeral 130 may refer to a hydrophobic layer, and a reference numeral 140 may refer to an insulating layer.

Figure 6:
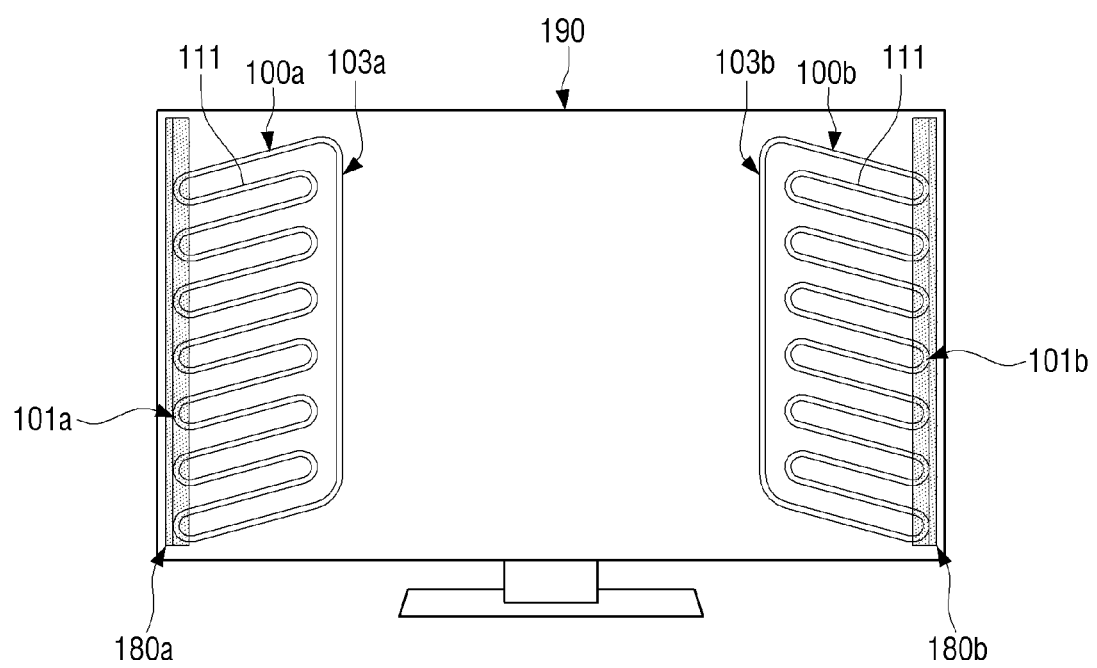
FIG. 6 is a schematic diagram illustrating a state in which the energy harvesting apparatus is installed in a display apparatus according to another exemplary embodiment.

Referring to FIG. 6, energy harvesting apparatuses 100*a* and 100*b* according to another exemplary embodiment may be applied to a display apparatus 190 (e.g., television (TV) and a monitor). The energy harvesting apparatuses 100*a* and 100*b* of FIG. 6 may have the same configuration as most components of the aforementioned energy harvesting apparatus 100 of FIG. 5, except that the housing 111 is inclined.

Portions corresponding to heat inputters 101*a* and 101*b* of the energy harvesting apparatuses 100*a* and 100*b* of FIG. 6 may be disposed to contact backlight units 180*a* and 180*b* positioned at an edge of the display apparatus 190, respectively. In this case, the backlight units 180*a* and 180*b* may act as a heat source of the energy harvesting apparatuses 100*a* and 100*b*. Portions of the energy harvesting apparatuses 100*a* and 100*b*, which correspond to heating portions 103*a* and 103*b*, may be spaced apart from the backlight units 180*a* and 180*b*.

In addition, the energy harvesting apparatuses 100*a* and 100*b* may be inclined upwards and towards the heating portions 103*a* and 103*b* at a predetermined angle so as to allow bubbles generated via phase change of dielectric liquid heated by the heat inputters 101*a* and 101*b* to move upwards along a path of the housing 111.

Likewise, the energy harvesting apparatuses 100*a* and 100*b* disposed in the display apparatus 190 may absorb heat, which is naturally generated during driving of the backlight units 180*a* and 180*b*, through the heat inputters 101*a* and 101*b* so as to generate electric energy. The generated electric energy may be stored in a capacitor or a rechargeable battery.

In addition, the energy harvesting apparatuses 100*a* and 100*b* may achieve a heat dissipation effect of transferring heat generated by the backlight units 180*a* and 180*b* to the entire housing 111 via a procedure in which bubbles are condensed via phase change to return to dielectric liquid according to heat absorbed through the heat inputters 101*a* and 101*b*.

Figure 7:
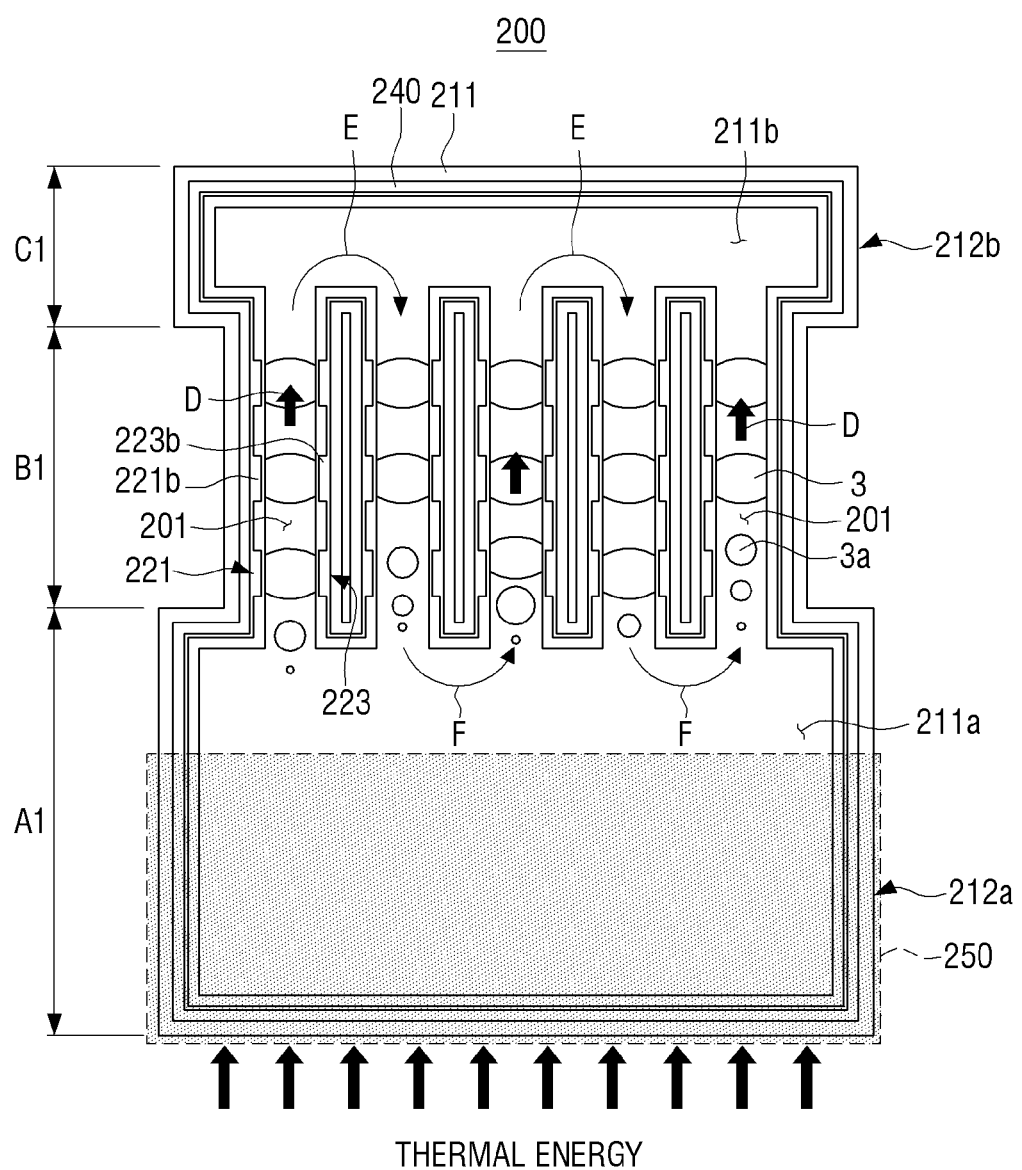
FIG. 7 is a schematic diagram illustrating an energy harvesting apparatus according to another exemplary embodiment.

Referring to FIG. 7, an energy harvesting apparatus 200 according to another exemplary embodiment is similar to the energy harvesting apparatuses 100*a* and 100*b* of FIG. 6 in terms of a plurality of paths 201. However, although a plurality of paths 101*a* are connected in series to each other in FIG. 6, the paths 201 are connected in parallel to each other in FIG. 7.

A higher amount of heat may be applied to the energy harvesting apparatus 200 of FIG. 7 from a heat source because an area of a heat inputter 212*a*, which contacts the heat source, is larger than in FIG. 6.

When a temperature of the energy harvesting apparatus 200 reaches a boiling point or above, the bubbles 3 may be moved in an arrow direction D along the paths 201. In other words, the bubbles 3 may move to a second end portion 212*b* (section C1) corresponding to a heating portion from a first end portion (section A1) of the energy harvesting apparatus 200 corresponding to the heat inputter 212*a*.

Then when a predetermined time period elapses, bubbles 3 may circulate in one direction, for example, in an arrow direction E and in an arrow direction F. In this case, current may be generated while the bubbles 3 are passing between first and second electrode portions 221 and 223.

A reference numeral 221*b* may refer to an electrode pattern of the first electrode portion 221, a reference numeral 223*b* may refer to an electrode pattern of the second electrode portion 223, a reference numeral 230 may refer to a hydrophobic layer, a reference numeral 240 may refer to an insulating layer, and a reference number 250 may refer to a heat inputter. A reference number 211 may refer to a housing, and reference numbers 211*a* and 211*b* may refer to dielectric fluid.

Hereinafter, an example in which power accumulated from a heat source through the aforementioned energy harvesting apparatus according to the exemplary embodiments is used as standby power of a display apparatus (e.g., a TV) will be described.

In general, in order to receive an infrared signal transmitted from a remote controller when a user wants to turn on a TV using the remote controller while the TV is turned off, the TV needs to be maintained in a standby state in which the TV is not completely turned off, that is, an infrared-ray receiver and submicom included in the TV needs to be maintained in an on-state, and to this end, standby power is required. However, recently, since environment and energy consumption have been an issue, standby power has also been considered as a sensitive issue, and thus when a TV is not used, the number of users that basically shut off power consumption by pulling a plug out of a socket has increased.

Power accumulated through the aforementioned energy harvesting apparatus according to the exemplary embodiments may be used as standby power consumed in a TV standby mode, as described above. However, a device that unnecessarily consumes power may be shut off and only minimum power may be used by adding a new type power source to a typical power source and switching the new type power source instead of simply substituting an alternating current (AC) power used as standby power of a TV with a capacitor or a rechargeable battery. That is, a communication device (e.g., ZigBee) using a high frequency signal lower than an infrared ray signal as power for receiving a remote control signal includes a micom installed therein. When the high frequency communication device is used, it may not be necessary to turn on a submicom included in a TV. As such, minimal standby power may be consumed, and thus it may be possible to manufacture a TV that may manage a standby mode with lower standby power than a typical TV.

Hereinafter, a configuration of a display apparatus for minimizing standby power consumption will be described with reference to FIGS. 8 to 11. FIGS. 8 to 11 are schematic diagrams illustrating a display apparatus using standby power accumulated using an energy harvesting apparatus according to exemplary embodiments.

Figure 8:
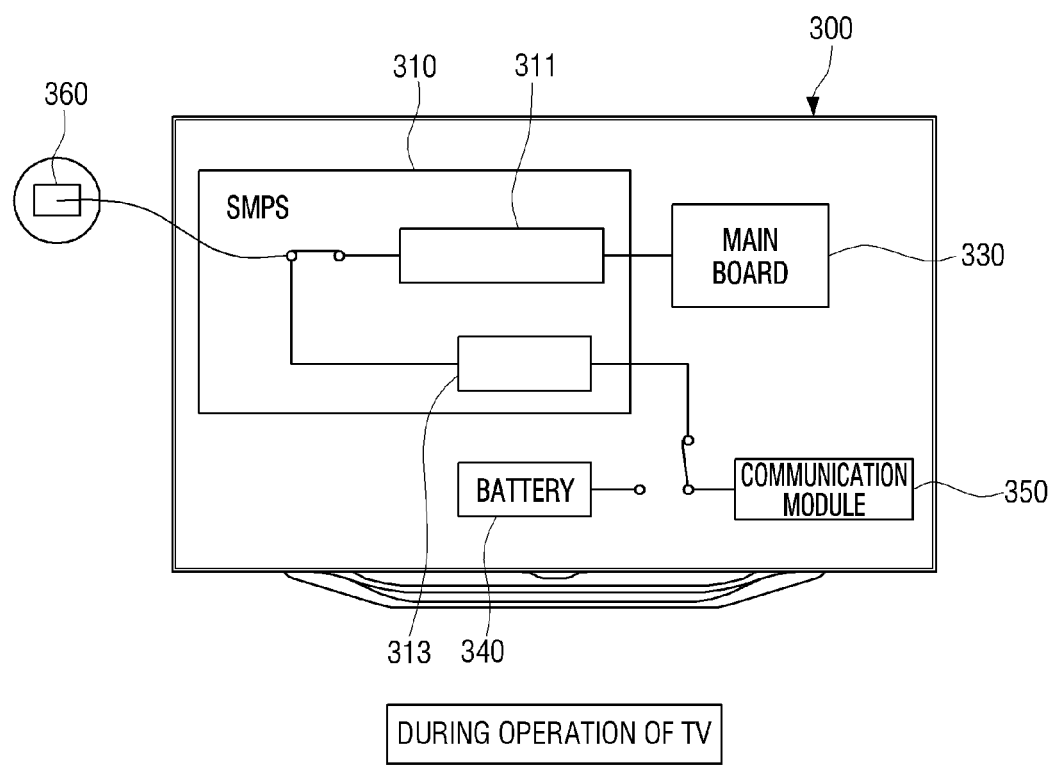

Referring to FIG. 8, a television (TV) 300 may include a switching mode power supply (SMPS) 310. The switching mode power supply (SMPS) 310 may include a main power source 311 and a secondary power source 313. The main power source 311 may be electrically connected to a main board 330 to be controlled by the main board 330. The switching mode power supply (SMPS) 310 may be connected to an energy harvest apparatus 360. Although FIG. 8 illustrates the energy harvest apparatus 360 as being disposed outside the TV 330, the present exemplary embodiment is not limited thereto and the energy harvest apparatus 360 may be placed in the TV 300.

The TV 300 may further include a communication module 350 that may be implemented with, for example, ZigBee using a high frequency signal lower than an infrared signal for its power source. The communication module 350 may be configured to switch on or off the secondary power source 313 or the rechargeable battery 340 to be selectively connected to one of the secondary power source 313 and a rechargeable battery 340. In order to switch on or off the communication module 350, a field-effect transistor (FET) semiconductor switch may be used.

As illustrated in FIG. 8, during an operation of the TV 300, external power may be separately supplied to the main power source 311 and the secondary power source 313, and the secondary power source 313 may be switched on to allow the communication module 350 to use the external power.

When a user pushes a power on/off button 410 of a remote controller 400 to turn off the TV 300 during an operation of the TV 300, the TV 300 may be turned off to be converted into a standby mode. In this case, a micom included in the communication module 350 may issue a command to change a switch state.

Figure 9:
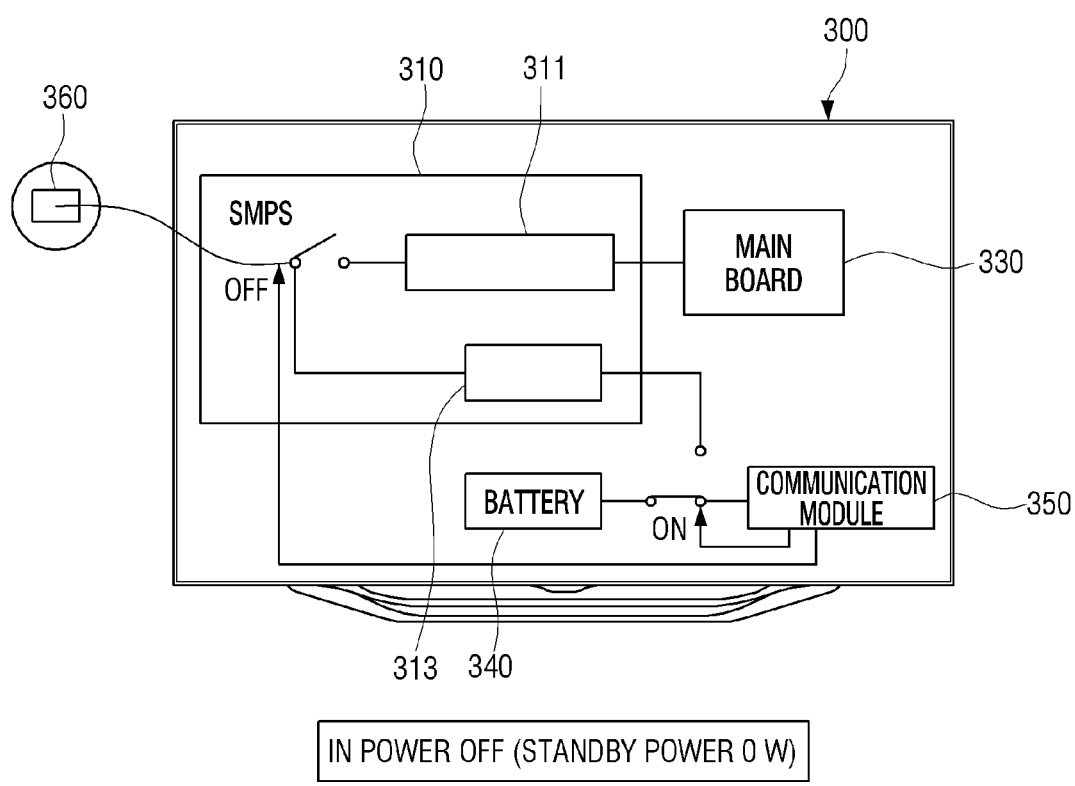

That is, referring to FIG. 9, external power transmitted to the main power source 311 may be shut off through a relay switch and the communication module 350 is powered on by switching on the rechargeable battery 340 so as to receive power from the rechargeable battery 340. In this case, the communication module 350 includes a micom, and thus the TV 300 does not necessarily include a submicom.

As illustrated in FIG. 9, when current does not flow in the secondary power source 313, 0.04 W is consumed and standby power consumed by the communication module 350 is 0.006 W, and thus total standby power consumed by the TV 300 is a slight low amount of about 0.05 W.

Figure 10:
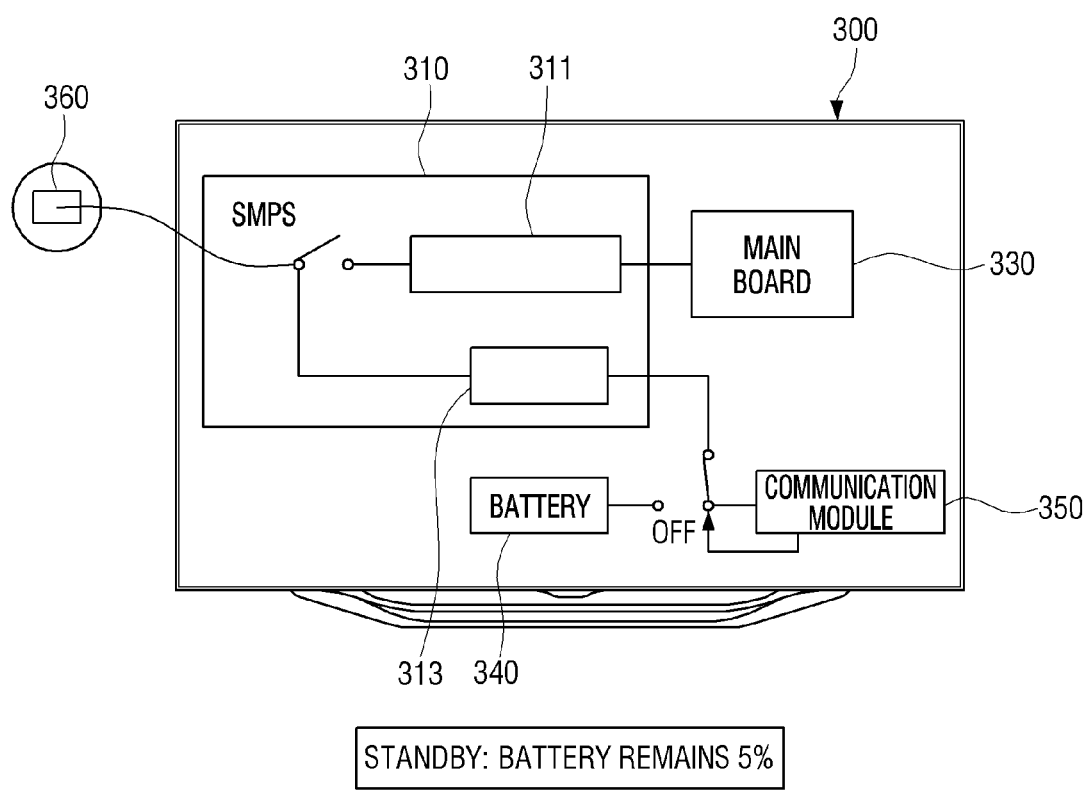

Referring to FIG. 10, when a micom of the communication module 350 detects that remains of the rechargeable battery 340 is 5%, a power source of the communication module 350 may be changed to the secondary power source 313 via switching. Accordingly, when the rechargeable battery 340 is prevented, the communication module 350 may be prevented from malfunctioning.

Referring to FIG. 11, as described above, when a user pushes the power on/off button 410 of the remote controller 400 while the TV 300 is turned off, the main power source 311 may be switched on to supply power so as to turn on the TV 300 through a command issued by a micom of the communication module 350.

Although a typical TV consumes about 0.27 W as standby power, the TV 300 may consume only about 0.05 W as standby power so as to lower standby power by as much as 20% or less compared with the typical TV. In addition, since energy standard limit has a margin value of about 0.25 W, and thus more functions may also be additionally performed in a standby mode compared with the typical TV.

Thus far, although various exemplary embodiments have been separately described, the exemplary embodiments may not be necessarily embodied alone, and configurations and operations of the exemplary embodiments may be combined with at least one of other exemplary embodiments.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An energy harvesting apparatus comprising:
   a housing that comprises an internal portion filled with dielectric liquid in a vacuum state;
   first and second electrode portions that are disposed to face each other in the housing and configured to be polarized with different polarities;
   a first layer that forms a path along the internal portion of the housing to allow the dielectric liquid and bubbles generated from the dielectric liquid to flow through the path; and
   a second layer configured to insulate the first and second electrode portions from the housing,
   wherein:
   the bubbles are generated from the dielectric liquid when thermal energy is applied to the housing; and
   the first and second electrode portions change a dielectric constant of the dielectric liquid when the bubbles move between the first and second electrode portions to generate current.

2. The energy harvesting apparatus as claimed in claim 1, wherein a first electrode pattern of the first electrode portion is symmetrical to a second electrode pattern of the second electrode portion.

3. The energy harvesting apparatus as claimed in claim 2, wherein a first end of the first electrode pattern and a first end of the second electrode pattern face each other, and are positioned on a first imaginary straight line that contacts an outer periphery of the path, and wherein a second end of the first electrode pattern and a second end of the second electrode pattern face each other, and are positioned on a second imaginary straight line that contacts the outer periphery of the path and is positioned in parallel to the first imaginary straight line.

4. The energy harvesting apparatus as claimed in claim 1, wherein the path has a constant inner diameter from a first end portion of the housing to a second end portion of the housing.

5. The energy harvesting apparatus as claimed in claim 1, wherein the first layer is formed of a hydrophobic material.

6. The energy harvesting apparatus as claimed in claim 2, wherein the housing comprises a bubble size determining member that is disposed in one side to which heat is input from a heat source and configured to adjust a size of the bubbles.

7. The energy harvesting apparatus as claimed in claim 6, wherein the bubble size determining member adjusts the size of the bubbles to be a size corresponding to an inner diameter of the path.

8. The energy harvesting apparatus as claimed in claim 7, wherein the bubble size determining member comprises an inlet and an outlet and has a shape of a cone with a diameter that gradually tapers towards the outlet from the inlet.

9. The energy harvesting apparatus as claimed in claim 8, wherein the outlet is disposed before a position where the first and second electrode patterns are started.

10. The energy harvesting apparatus as claimed in claim 1, wherein the housing has a repeated s-shape.

11. The energy harvesting apparatus as claimed in claim 10, wherein:

the housing comprises a plurality of paths comprising the path; and the plurality of paths are connected in series to each other.

12. The energy harvesting apparatus as claimed in claim 11, wherein the first and second electrode portions are arranged as a pair at positions at which the plurality of paths are formed.

13. The energy harvesting apparatus as claimed in claim 1, wherein:

the housing comprises a heat inputter that has an area larger than an area of a heating portion; and a plurality of paths comprising the path are formed between the heat inputter and the heating portion.

14. The energy harvesting apparatus as claimed in claim 13, wherein the first and second electrode portions are arranged as a pair in the plurality of paths.

15. The energy harvesting apparatus as claimed in claim 13, wherein the plurality of paths are connected in parallel to each other.

16. An energy harvesting apparatus comprising:

a housing that comprises an internal portion filled with dielectric liquid and is extended in a longitudinal direction; and positive and negative electrode portions arranged to be symmetrical with each other along the internal portion of the housing, wherein:

bubbles are generated from the dielectric liquid when thermal energy is applied to the housing, and the positive and negative electrode portions change a dielectric constant of the dielectric liquid when the bubbles move between the positive and negative electrode portions to generate current.

17. An electronic apparatus comprising:

a heat source; and an energy harvesting apparatus configured to absorb thermal energy emitted from the heat source to generate electric energy via a reverse electrowetting method, wherein:

the energy harvesting apparatus comprises a housing that comprises an internal portion filled with dielectric liquid in a vacuum state, and first and second electrode portions that are disposed to face each other in the housing and configured to be polarized with different polarities; and bubbles are generated from the dielectric liquid when thermal energy is applied to the housing, and the first and second electrode portion, change a dielectric constant of the dielectric liquid when the bubbles move between the first and second electrode portions to generate current.

18. The electronic apparatus as claimed in claim 17, further comprising:

a first layer that forms a path along the internal portion of the housing to allow the dielectric liquid and the bubbles to flow through the path; and a second layer configured to insulate the first and second electrode portions from the housing, wherein the path has a constant inner diameter from a first end portion of the housing to a second end portion of the housing.

19. The electronic apparatus as claimed in claim 18, wherein:

the housing comprises a bubble size determining member disposed in one side to which heat is input from a heat source and configured to adjust a size of the bubbles; and the bubble size determining member comprises an inlet and an outlet and has a shape of a cone with a diameter that gradually tapers the outlet from the inlet.

20. The electronic apparatus as claimed in claim 17, wherein the energy harvesting apparatus further comprises a plurality of paths through which the dielectric liquid and the bubbles flow, and the plurality of paths are connected in series or parallel to each other.

* * * * *